Patented Aug. 25, 1953

2,650,230

UNITED STATES PATENT OFFICE 2,650,230

XANTHENE-9-CARBOXYLIC ACID ESTERS OF NUCLEARLY ALKYLATED 4-PIPERIDINOLS AND SALTS THEREOF

John W. Cusic, Skokie, Ill., assignor to G. D. Searle & Co., Chicago, Ill., a corporation of Illinois No Drawing. Application January 23, 1951, Serial No. 207,431

13 Claims. (Cl. 260—294.3)

The present invention relates to a new class of organic heterocyclic compounds and more particularly to xanthene-9-carboxylates of nuclear alkylation products of 4-piperidinol. The esters which constitute my invention are the bases represented by the following structural formula and salts thereof

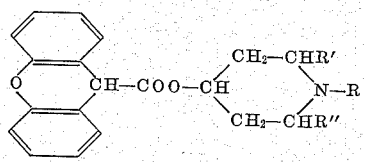

wherein R, R', and R'' are members of the class comprising hydrogen and lower radicals of the aliphatic type. In the foregoing structural formula these radicals R, R', and R'' may represent hydrogen and such lower radicals of aliphatic type as methyl, ethyl, n-propyl, i-propyl, straight and branch chained butyl, pentyl and hexyl, benzyl, phenethyl, and the like. Alkenyl radicals such as allyl, crotyl, butenyl and the like are also within the scope of the invention.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

The object of this invention is to provide new heterocyclic compositions of the type indicated above. These xanthene-9-carboxylates are valuable intermediates in organic synthesis. They have been found to possess a number of highly useful pharmacodynamic properties. Thus the quaternary derivatives act as powerful spasmolytics, sympatholytics, parasympathicolytics and ganglionic blocking agents. It is of special interest that inorganic acid salts of the tertiary bases described herein have a potent atropine-like spasmolytic effect as demonstrated in the isolated rabbit intestine. These tertiary base salts lack certain of the systemic side reactions of the quaternary type of spasmolytics which are undesirable in certain therapeutic applications of these drugs. The salts of the xanthene-9-carboxylates of this invention, particularly of the quaternary piperidinium type, are also useful as active ingredients in parasiticidal compositions of matter.

The esters may advantageously be prepared by causing an acid halide of xanthene-9-carboxylic acid to react upon the 4-piperidinol derivative, either with or without the use of an inert diluent.

My invention will be described more fully in combination with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of the examples, temperatures are given uncorrected in degrees centigrade (° C.), pressures in vacuum distillations as millimeters of mercury (mm.), and quantities of material as parts by weight.

EXAMPLE 1

*Xanthene-9-carboxylate of 1-methyl-4-piperidinol*

452 parts of xanthene-9-carboxylic acid are heated at refluxing temperature for three hours with a solution of 350 parts of thionyl chloride in 2600 parts of anhydrous benzene. While the benzene and the thionyl chloride are distilled off, dry toluene is added. The resulting xanthene-9-carbonyl chloride is filtered with the aid of decolorizing charcoal, and 230 parts of 1-methyl-4-piperidinol are added with cooling. When the vigorous reaction has subsided, the mixture is heated at refluxing temperature for two hours. Upon standing, a yellowish solid forms which is separated and then heated with dilute hydrochloric acid and toluene. Most of the solid material goes into solution. After filtration, the aqueous layer is separated, cooled and extracted with ether. The aqueous layer is then made alkaline by addition of sodium hydroxide, and the base is extracted with ether. The ether solution is dried over anhydrous potassium carbonate, filtered and evaporated. The basic xanthene-9-carboxylate of 1-methyl-4-piperidinol thus obtained is precipitated as the hydrochloride from dry ether by addition of alcoholic hydrogen chloride. The ether is decanted, and the residue is warmed with ethyl acetate, The precipitated hydrochloride, after recrystillization from a mixture of ethanol and ether, melts at about 219–221° C.

EXAMPLE 2

*Xanthene-9-carboxylate of 1,1-dimethyl-4-hydroxypiperidinium bromide*

120 parts of methyl bromide are added to 120 parts of the xanthene-9-carboxylate of 1-methyl-4-piperidinol in 400 parts of butanol in a shielded pressure bottle. After storage at 0° C., the xanthene-9-carboxylate of 1,1-dimethyl-4-hydroxypiperidinium bromide precipitates. It is recrystallized from isopropanol with the aid of decolorizing charcoal. The melting point is about 226–227° C.

EXAMPLE 3

*Xanthene-9-carboxylate of 1-(β-phenethyl)-4-piperidinol*

A mixture of 122 parts of xanthene-9-carbonyl chloride and 105 parts of 1-(β-phenethyl)-4-piperidinol in 1500 parts of butanone is heated under reflux with agitation at boiling temperature for 5 hours. After cooling, the mixture is stirred with charcoal and filtered. The filtrate is rendered alkaline and extracted with ether. The ether extract is dried over anhydrous potassium carbonate, stirred with charcoal and filtered. Evaporation of the solvent yields the xanthene-9-carboxylate of 1-(β-phenethyl)-4-piperidinol as an oil which crystallizes on standing. A crystalline water-soluble hydrochloride is obtained by treatment of the dry ether solution with a solution of 25% hydrogen chloride in anhydrous isopropanol.

EXAMPLE 4

*Xanthene-9-carboxylate of 1-methyl-4-hydroxylupetidine*

244 parts of xanthene-9-carbonyl chloride and 143 parts of 1-methyl-4-hydroxylupetidine are mixed in 2400 parts of butanone. A heavy solid precipitate forms. After heating at refluxing temperature for 4 hours, one cools and filters. The precipitate dissolves completely in water. After clarification by filtration with charcoal, the aqueous solution is rendered alkaline and the precipitate of the xanthene-9-carboxylate of 1,1-dimethyl-4-hydroxypiperidine is crystallized from ethanol using charcoal for decolorization. The product melts at about 106–107° C. It is dissolved in ether and treated with a 25% solution of hydrogen chloride in isopropanol. The oily hydrochloride is decanted and then dissolved by heating with isopropanol and a small amount of water. Upon cooling the crystalline hydrochloride is obtained which melts at about 244–245° C.

EXAMPLE 5

*Xanthene-9-carboxylate of 1,1,2,6-tetramethyl-4-hydroxypiperidinium bromide*

87 parts of methyl bromide are added to 30 parts of xanthene-9-carboxylate of 1,1-dimethyl-4-hydroxylupetidine in 600 parts of chloroform and the mixture is heated in a shielded pressure bottle at 80° C. for 15 hours. After concentration on the steam bath, the solution is cooled and ether is added. The xanthene-9-carboxylate of 1,1,2,6-tetramethyl-4-hydroxypiperidinium bromide thus precipitated is filtered and recrystallized from dilute isopropanol. It melts at about 257–258° C.

In order to obtain the corresponding dihydrogen citrate, a solution of 3 mols of the bromide in anhydrous isopropanol is treated with one mol of silver citrate and two mols of anhydrous citric acid. The mixture is stirred for some time with warming and the silver bromide removed by filtration. The filtrate is evaporated in vacuo. The oily residue is washed with ether and crystallized from dioxane. Other salts, such as the malate, tartrate, acetate, and nitrate are obtained in analogous manner.

EXAMPLE 6

*Xanthene-9-carboxylate of 1-allyl-2,6-dimethyl-4-piperidinol*

A mixture of 290 parts of xanthene-9-carbonyl bromide and 169 parts of 1-allyl-4-hydroxylupetidine in 2500 parts of butanone are stirred and heated at refluxing temperature for 4 hours. After cooling, the precipitate is collected on a filter and then heated with toluene and dilute hydrochloric acid. A small amount of insoluble residue is removed by filtration and the aqueous layer is separated, cooled and extracted with ether. The aqueous residue is then rendered alkaline by addition of potassium hydroxide, and the base is extracted with ether. The ether extract is dried over anhydrous potassium carbonate, stirred with charcoal, filtered, and evaporated. The residue is redissolved in dry ether and treated with a 25% solution of hydrogen chloride in isopropanol. The hydrochloride of the xanthene-9-carboxylate of 1-allyl-2,6-dimethyl-4-piperidinol is a colorless powder which is readily soluble in water.

EXAMPLE 7

*Xanthene-9-carboxylate of 2,2-dimethyl-6-isobutyl-4-piperidinol*

A mixture of 49 parts of xanthene-9-carbonyl chloride and 37 parts of 2,2-dimethyl-6-isobutyl-4-piperidinol are heated at refluxing temperature with agitation for 5 hours. The resulting mixture is then cooled, and after precipitation is complete the product is collected on a filter and heated with toluene and dilute hydrochloric acid. Insoluble impurities are removed on a filter and the aqueous layer is separated, extracted with ether, and finally rendered alkaline by addition of sodium hydroxide. The alkaline solution is then extracted with ether and the ether layer is dried over anhydrous potassium carbonate, stirred with charcoal and filtered. Upon evaporation the xanthene-9-carboxylate of 2,2-dimethyl-6-isobutyl-4-piperidinol is obtained. It is redissolved in dry ether and converted into the hydrochloride by addition of a 25% hydrogen chloride solution in isopropanol. The resulting hydrochloride is a white powder which is very soluble in water.

I claim:

1. The group of new compounds consisting of the xanthene-9-carboxylates of alkylated 4-piperidinols of the structural formula

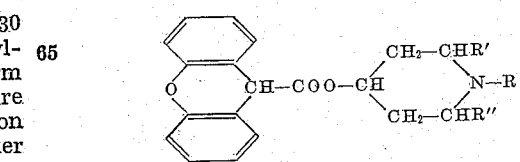

wherein R, R', and R'' are members of the class comprising hydrogen, lower alkyl and aralkyl radicals, and salts thereof.

2. The xanthene-9-carboxylates of 1-alkyl-4- piperidinols of the structural formula

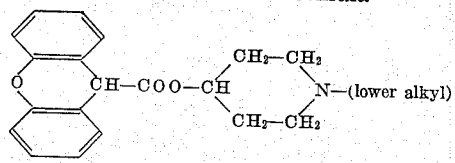

3. The xanthene-9-carboxylate of 1-methyl-4-piperidinol of the structural formula

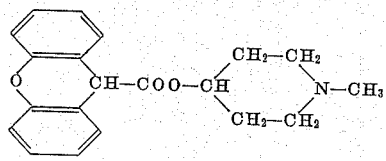

4. The xanthene-9-carboxylates of 1,1-dialkyl-4-hydroxypiperidinium salts of the structural formula

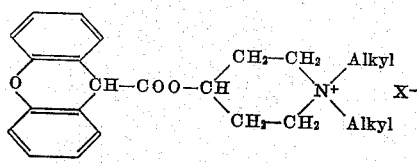

wherein X is one equivalent of an anion and alkyl represents a lower alkyl radical.

5. The xanthene-9-carboxylates of 1,1-dimethyl-4-hydroxypiperidinium salts.

6. The xanthene-9-carboxylates of 1,2,6-trialkyl-4-piperidinols of the structural formula

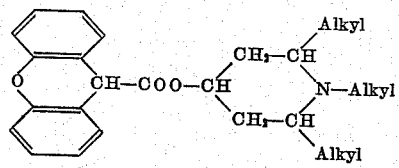

and alkyl represents a lower alkyl radical.

7. The xanthene-9-carboxylates of 1-alkyl-2,6-dimethyl-4-piperidinols of the structural formula

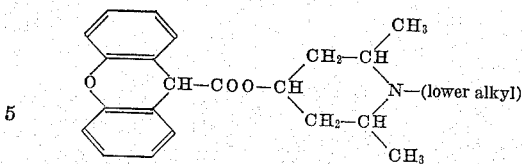

8. The xanthene-9-carboxylates of 1,2,6-trimethyl-4-piperidinol.

9. The xanthene-9-carboxylates of 1,1,2,6-tetraalkyl-4-hydroxypiperidinium salts of the structural formula

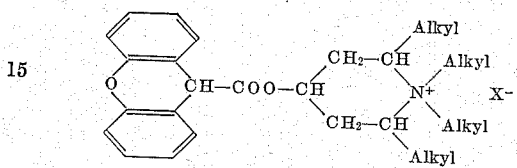

wherein X is one equivalent of an anion and alkyl represents a lower alkyl radical.

10. The xanthene-9-carboxylates of 1-alkyl-1,2,6-trimethyl-4-hydroxypiperidinium salts of the structural formula

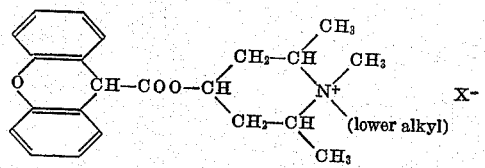

wherein X- is one equivalent of an anion.

11. The xanthene-9-carboxylates of 1,1,2,6-tetramethyl-4-hydroxypiperidinium salts.

12. The hydrochloride of 1-methyl-4-piperidinol xanthene-9-carboxylate.

13. The methobromide of 1-methyl-4-piperidinol xanthene-9-carboxylate.

JOHN W. CUSIC.

References Cited in the file of this patent

UNITED STATES PATENTS

| Number | Name | Date |
|---|---|---|
| 2,334,310 | Burtner | Nov. 16, 1943 |
| 2,387,879 | Burtner | Oct. 30, 1945 |